(12) United States Patent
Bruno et al.

(10) Patent No.: US 12,475,485 B2
(45) Date of Patent: Nov. 18, 2025

(54) LINKING A CONTEXT ENVIRONMENT TO A CONTEXT SERVICE

(71) Applicant: American Express Travel Related Services Company, Inc., New York, NY (US)

(72) Inventors: John Bruno, Phoenix, AZ (US); Sibish Neelikattil Basheerahammed, Phoenix, AZ (US); Premkumar Manivannan, Phoenix, AZ (US); Nageshwara R. Chirravuri, Chandler, AZ (US); Sathish Muthukrishnan, Phoenix, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 52 days.

(21) Appl. No.: 17/683,883

(22) Filed: Mar. 1, 2022

(65) Prior Publication Data

US 2022/0237661 A1     Jul. 28, 2022

Related U.S. Application Data

(63) Continuation of application No. 16/447,395, filed on Jun. 20, 2019, now Pat. No. 11,282,112, which is a
(Continued)

(51) Int. Cl.
*G06Q 30/00*      (2023.01)
*G06Q 20/12*      (2012.01)
(Continued)

(52) U.S. Cl.
CPC ......... *G06Q 30/0269* (2013.01); *G06Q 20/12* (2013.01); *G06Q 20/20* (2013.01);
(Continued)

(58) Field of Classification Search
None
See application file for complete search history.

(56) References Cited

U.S. PATENT DOCUMENTS 5,500,890 A     3/1996  Rogge et al.
5,991,750 A    11/1999  Watson
(Continued)

FOREIGN PATENT DOCUMENTS

WO     2014106207 A1    7/2014
WO     2015102889 A1    7/2015
WO     2015134947 A1    9/2015

OTHER PUBLICATIONS

Did Shopkkick Just Change the Check-In Game? You Be the Judge—https://techcrunch.com/2010/08/03/shopkick/?guccounter=1—-2010—MG Siegler (Year: 2010).*
(Continued)

*Primary Examiner* — Christopher Stroud
(74) *Attorney, Agent, or Firm* — Thomas | Horstemeyer LLP

(57) ABSTRACT

A contextual services delivery system that may deliver different contextual services to a smartphone and/or a POS terminal in response to a context environment, which can provide a user with a customized contextual services experience. In one embodiments, the system may be configured to identify a mobile device of a user entering a store location based on a POS terminal detecting the mobile device. The system can cause a display of an inventory of products for the store location and receive a selection of a product. A payment amount for the product can be displayed on the mobile device. An additional product can be selected based on a context characteristic of the product. An update for the additional product can be displayed on the mobile device. An acceptance of the additional product from the mobile
(Continued)

device can be received. The payment amount is modified at the POS terminal.

20 Claims, 7 Drawing Sheets

Related U.S. Application Data continuation of application No. 14/318,091, filed on Jun. 27, 2014, now Pat. No. 10,360,597.

(51) Int. Cl.
　　*G06Q 20/20*　　　(2012.01)
　　*G06Q 20/32*　　　(2012.01)
　　*G06Q 20/38*　　　(2012.01)
　　*G06Q 20/40*　　　(2012.01)
　　*G06Q 30/0207*　　(2023.01)
　　*G06Q 30/0251*　　(2023.01)
　　*H04W 4/21*　　　(2018.01)
　　*H04W 4/80*　　　(2018.01)

(52) U.S. Cl.
　　CPC ......... *G06Q 20/202* (2013.01); *G06Q 20/322* (2013.01); *G06Q 20/387* (2013.01); *G06Q 20/40145* (2013.01); *G06Q 30/0222* (2013.01); *G06Q 30/0253* (2013.01); *G06Q 30/0261* (2013.01); *G06Q 30/0267* (2013.01); *G06Q 30/0268* (2013.01); *H04W 4/21* (2018.02); *H04W 4/80* (2018.02)

(56) References Cited

U.S. PATENT DOCUMENTS

| | | | |
|---|---|---|---|
| 6,014,636 A | 1/2000 | Reeder | |
| 6,014,647 A | 1/2000 | Nizzari et al. | |
| 6,119,099 A | 9/2000 | Walker et al. | |
| 6,185,683 B1 | 2/2001 | Ginter et al. | |
| 6,401,074 B1 | 6/2002 | Sleeper | |
| 6,965,868 B1 | 11/2005 | Bednarek | |
| 7,010,267 B2 | 3/2006 | Vanluijt et al. | |
| 7,147,149 B2 | 12/2006 | Giraldin et al. | |
| 7,254,388 B2 | 8/2007 | Nam et al. | |
| 7,353,208 B1 | 4/2008 | Stambaugh | |
| 7,364,071 B2 | 4/2008 | Esplin et al. | |
| 7,386,485 B1 | 6/2008 | Mussman et al. | |
| 7,702,540 B1 | 4/2010 | Woolston | |
| 7,729,945 B1 | 6/2010 | Katz et al. | |
| 7,739,157 B2 | 6/2010 | Bonner et al. | |
| 7,926,717 B2 | 4/2011 | McIntosh | |
| 7,962,361 B2 | 6/2011 | Ramchandani et al. | |
| 8,015,088 B2 | 9/2011 | Phillips et al. | |
| 8,032,414 B2 | 10/2011 | Payne et al. | |
| 8,096,468 B2 | 1/2012 | Myers et al. | |
| 8,205,794 B2 | 6/2012 | Myers et al. | |
| 8,271,322 B2 | 9/2012 | Ariyibi | |
| 8,285,588 B2 | 10/2012 | Postrel | |
| 8,295,835 B2 | 10/2012 | Coppinger et al. | |
| 8,369,842 B2 | 2/2013 | Proctor, Jr. et al. | |
| 8,385,896 B2 | 2/2013 | Proctor, Jr. et al. | |
| 8,423,048 B2 | 4/2013 | Morrison | |
| 8,483,714 B2 | 7/2013 | Agardh et al. | |
| 8,489,112 B2 | 7/2013 | Roeding et al. | |
| 8,533,000 B1 | 9/2013 | Pletz et al. | |
| 8,534,551 B2 | 9/2013 | Rothschild | |
| 8,538,389 B1 | 9/2013 | Evans et al. | |
| 8,567,671 B2 | 10/2013 | Myers et al. | |
| 8,571,937 B2 | 10/2013 | Rose et al. | |
| 8,589,245 B2 | 11/2013 | Michaelis et al. | |
| 8,600,804 B2 | 12/2013 | Ramchandani et al. | |
| 8,618,932 B2 | 12/2013 | Maia et al. | |
| 8,666,891 B2 | 3/2014 | Roberts | |
| 8,676,663 B1 | 3/2014 | Robinson et al. | |
| 8,688,460 B1 | 4/2014 | Pletz et al. | |
| 8,700,530 B2 | 4/2014 | Smith | |
| 8,738,435 B2 | 5/2014 | Libman | |
| 8,740,064 B2 | 6/2014 | Griffin et al. | |
| 8,744,939 B2 | 6/2014 | Phillips et al. | |
| 8,750,868 B2 | 6/2014 | Laroia et al. | |
| 8,774,753 B2 | 7/2014 | Jabara et al. | |
| 8,798,647 B1 | 8/2014 | Haney | |
| 8,818,268 B2 | 8/2014 | Matoba et al. | |
| 8,825,085 B1 | 9/2014 | Boyle et al. | |
| 8,825,538 B2 | 9/2014 | Insolia et al. | |
| 9,015,277 B1 | 4/2015 | Slavin et al. | |
| 9,326,226 B2 | 4/2016 | Bahram Pour | |
| 9,665,881 B1 | 5/2017 | Ward | |
| 9,833,714 B2 | 12/2017 | Olson et al. | |
| 10,062,073 B2 | 8/2018 | Baldie | |
| 10,217,151 B1 | 2/2019 | Greiner et al. | |
| 10,360,597 B2 | 7/2019 | Bruno et al. | |
| 10,395,237 B2 | 8/2019 | Basheerahammed et al. | |
| 10,515,384 B2 | 12/2019 | Bruno et al. | |
| 11,010,748 B2 | 5/2021 | Baldie | |
| 11,159,517 B2 | 10/2021 | Jain et al. | |
| 11,232,187 B2 | 1/2022 | Bruno et al. | |
| 2001/0047296 A1 | 11/2001 | Wyker | |
| 2002/0147639 A1 | 10/2002 | Williams et al. | |
| 2002/0161653 A1* | 10/2002 | Walker | G07G 1/12 700/231 |
| 2003/0028481 A1 | 2/2003 | Flitcroft et al. | |
| 2003/0097571 A1 | 5/2003 | Hamilton et al. | |
| 2003/0212595 A1 | 11/2003 | Antonucci | |
| 2003/0220835 A1 | 11/2003 | Barnes | |
| 2004/0098332 A1 | 5/2004 | Dvir | |
| 2004/0205114 A1* | 10/2004 | Kinoshita | G06F 16/951 709/217 |
| 2004/0210477 A1 | 10/2004 | McIntyre | |
| 2005/0049765 A1 | 3/2005 | Chetia et al. | |
| 2005/0159863 A1 | 7/2005 | Howard et al. | |
| 2005/0209921 A1 | 9/2005 | Roberts et al. | |
| 2006/0047546 A1 | 3/2006 | Taylor et al. | |
| 2006/0277103 A1 | 12/2006 | Fujita et al. | |
| 2006/0293967 A1 | 12/2006 | Deluca et al. | |
| 2007/0061216 A1 | 3/2007 | Jain et al. | |
| 2007/0073582 A1 | 3/2007 | Jung et al. | |
| 2007/0073589 A1 | 3/2007 | Vergeyle et al. | |
| 2007/0235539 A1* | 10/2007 | Sevanto | G07F 7/1008 235/451 |
| 2007/0264974 A1 | 11/2007 | Frank et al. | |
| 2008/0109317 A1 | 5/2008 | Singh | |
| 2008/0114646 A1 | 5/2008 | Ash | |
| 2008/0262901 A1 | 10/2008 | Banga et al. | |
| 2008/0262928 A1 | 10/2008 | Michaelis | |
| 2008/0294621 A1 | 11/2008 | Kanigsberg et al. | |
| 2009/0138365 A1* | 5/2009 | Mueller | G06Q 30/0217 705/16 |
| 2009/0171853 A1 | 7/2009 | Georgiou et al. | |
| 2009/0254971 A1 | 10/2009 | Herz et al. | |
| 2009/0259516 A1 | 10/2009 | Zeevi et al. | |
| 2009/0292823 A1* | 11/2009 | King | H04L 67/06 709/217 |
| 2010/0082446 A1 | 4/2010 | Hjelm et al. | |
| 2010/0131347 A1 | 5/2010 | Sartipi | |
| 2010/0145730 A1 | 6/2010 | Abreu | |
| 2010/0146607 A1 | 6/2010 | Piepenbrink et al. | |
| 2010/0180009 A1 | 7/2010 | Callahan | |
| 2010/0320266 A1 | 12/2010 | White | |
| 2011/0029370 A1* | 2/2011 | Roeding | H04L 67/52 705/14.38 |
| 2011/0060640 A1 | 3/2011 | Thompson et al. | |
| 2011/0119141 A1* | 5/2011 | Hoyos | G06Q 20/20 705/16 |
| 2011/0231272 A1 | 9/2011 | Englund et al. | |
| 2011/0258049 A1 | 10/2011 | Ramer et al. | |
| 2012/0022944 A1 | 1/2012 | Volpi | |
| 2012/0066084 A1 | 3/2012 | Sneyders | |
| 2012/0095853 A1* | 4/2012 | von Bose | G06Q 20/20 705/16 |
| 2012/0117633 A1 | 5/2012 | Chakra et al. | |
| 2012/0233158 A1 | 9/2012 | Braginsky et al. | |

(56) References Cited

U.S. PATENT DOCUMENTS

| | | | |
|---|---|---|---|
| 2012/0265596 A1 | 10/2012 | Mazed et al. | |
| 2012/0316963 A1 | 12/2012 | Moshfeghi | |
| 2012/0324242 A1 | 12/2012 | Kirsch | |
| 2013/0006742 A1 | 1/2013 | Richard | |
| 2013/0018794 A1* | 1/2013 | Ungerland, II | G06Q 20/3274 705/44 |
| 2013/0204697 A1 | 8/2013 | Boal | |
| 2013/0204701 A1* | 8/2013 | Calafiore | G06Q 50/01 705/14.66 |
| 2013/0215116 A1* | 8/2013 | Siddique | G06Q 20/40 705/26.7 |
| 2013/0217332 A1 | 8/2013 | Altman et al. | |
| 2013/0251216 A1 | 9/2013 | Smowton et al. | |
| 2013/0297422 A1 | 11/2013 | Hunter et al. | |
| 2013/0325891 A1 | 12/2013 | Masood et al. | |
| 2013/0326009 A1 | 12/2013 | Morgan et al. | |
| 2013/0332251 A1* | 12/2013 | Ioannidis | G06Q 20/3274 705/26.8 |
| 2014/0046794 A1 | 2/2014 | Vallery et al. | |
| 2014/0058841 A1 | 2/2014 | Getchius | |
| 2014/0058875 A1 | 2/2014 | Yanchenko | |
| 2014/0067516 A1 | 3/2014 | Price et al. | |
| 2014/0095580 A1 | 4/2014 | Sartini et al. | |
| 2014/0108108 A1 | 4/2014 | Artman et al. | |
| 2014/0122228 A1 | 5/2014 | Wical | |
| 2014/0188733 A1 | 7/2014 | Granbery | |
| 2014/0214429 A1 | 7/2014 | Pantel | |
| 2014/0214562 A1* | 7/2014 | Cancro | G06Q 30/0631 705/16 |
| 2014/0344011 A1 | 11/2014 | Dogin et al. | |
| 2014/0365334 A1* | 12/2014 | Hurewitz | G06Q 30/0613 705/26.41 |
| 2015/0073980 A1 | 3/2015 | Griffin et al. | |
| 2015/0120475 A1* | 4/2015 | Pedley | G06Q 20/201 705/20 |
| 2015/0120558 A1 | 4/2015 | Andrews et al. | |
| 2015/0140982 A1 | 5/2015 | Postrel | |
| 2015/0142438 A1 | 5/2015 | Dai et al. | |
| 2015/0189620 A1 | 7/2015 | Metral | |
| 2015/0220924 A1 | 8/2015 | Bakker | |
| 2015/0230045 A1 | 8/2015 | Johnson et al. | |
| 2015/0242892 A1 | 8/2015 | Priebatsch | |
| 2015/0248702 A1 | 9/2015 | Chatterton | |
| 2015/0278824 A1 | 10/2015 | Zabar | |
| 2015/0302412 A1 | 10/2015 | Bhanoo | |
| 2015/0319579 A1 | 11/2015 | Syrjarinne et al. | |
| 2015/0332240 A1 | 11/2015 | Harwood et al. | |
| 2015/0339655 A1 | 11/2015 | Basheerahammed et al. | |
| 2015/0347999 A1* | 12/2015 | Lau | G06Q 20/32 705/18 |
| 2015/0363861 A1 | 12/2015 | Capel et al. | |
| 2015/0379581 A1 | 12/2015 | Bruno et al. | |
| 2015/0379601 A1 | 12/2015 | Ouimet | |
| 2015/0379650 A1 | 12/2015 | Theobald | |
| 2015/0381664 A1 | 12/2015 | Bruno et al. | |
| 2016/0019526 A1 | 1/2016 | Granbery et al. | |
| 2016/0019536 A1 | 1/2016 | Ortiz et al. | |
| 2016/0063476 A1 | 3/2016 | Baldie | |
| 2016/0267480 A1 | 9/2016 | Metral | |
| 2017/0091765 A1 | 3/2017 | Lloyd et al. | |
| 2017/0200151 A1 | 7/2017 | Bruno | |
| 2017/0330233 A1 | 11/2017 | Bruno et al. | |

OTHER PUBLICATIONS

Advisory Action dated Jan. 25, 2017 in U.S. Appl. No. 14/284,817.
Advisory Action dated Feb. 15, 2018 in U.S. Appl. No. 14/339,284.
Advisory Action dated Mar. 27, 2018 in U.S. Appl. No. 14/515,813.
Advisory Action dated Jun. 12, 2017 in U.S. Appl. No. 14/339,284.
Advisory Action dated Jun. 12, 2018 in U.S. Appl. No. 14/454,452.
Advisory Action dated Jun. 27, 2019 in U.S. Appl. No. 15/237,141.
Advisory Action dated Jul. 13, 2017 in U.S. Appl. No. 14/454,452.
Advisory Action dated Jul. 29, 2019 in U.S. Appl. No. 15/154,106.
Advisory Action dated Jul. 30, 2018 in U.S. Appl. No. 14/318,091.
Advisory Action dated Nov. 4, 2016 in U.S. Appl. No. 14/469,230.
Advisory Action dated Nov. 7, 2017 in U.S. Appl. No. 14/318,091.
Advisory Action dated Nov. 17, 2017 in U.S. Appl. No. 14/469,230.
Advisory Action dated Nov. 19, 2018 in U.S. Appl. No. 14/995,052.
Anonymous, "Swirl Delivers First End-to-End In-Store Mobile Marketing Platform for Major Retailers," Oct. 17, 2013, PR Newswire. (Year: 2013).
Apple, Inc., "Getting Started with iBeacon Version 1.0," Jul. 2, 2014, entire document.
Australian Examination Report No. 3 dated Sep. 7, 2018 in Application No. 2017201307.
Betters, E., "Apple's iBeacons explained: What it is and why it matters," Pocket-lint, Sep. 18, 2013 [retrieved Feb. 21, 2017]. Retrieved from Internet: <http:/web.archive.org/web/20130925141212/ http://www.pocket-lint.com/news/123730-apple-sibeacons-explained-what-it-is-and-why-it-matters>, 10 pages.
Examination Report dated Jan. 23, 2017 in Australian Application No. 2015201925.
Examination Report dated Feb. 24, 2017 in Australian Application No. 2015201925.
Examination Report dated Feb. 26, 2016 in Australian Application No. 2015201925.
Examination Report dated Aug. 3, 2016 in Australian Application No. 2015201925.
Examination Report dated Nov. 22, 2016 in Australian Application No. 2015201925.
Extended European Search Report dated Jun. 16, 2017 in European Application No. 15851256.6.
Final Office Action dated Jan. 24, 2018 in U.S. Appl. No. 14/515,813.
Final Office Action dated Mar. 16, 2017 in U.S. Appl. No. 14/454,452.
Final Office Action dated Mar. 28, 2017 in U.S. Appl. No. 14/339,284.
Final Office Action dated Apr. 12, 2019 in U.S. Appl. No. 15/237,141.
Final Office Action dated Apr. 20, 2018 in U.S. Appl. No. 14/454,452.
Final Office Action dated May 17, 2019 in U.S. Appl. No. 15/154,106.
Final Office Action dated Jun. 14, 2018 in U.S. Appl. No. 14/318,091.
Final Office Action dated Jul. 6, 2018 in U.S. Appl. No. 14/284,817.
Final Office Action dated Sep. 6, 2018 in U.S. Appl. No. 14/995,052.
Final Office Action dated Sep. 6, 2019 in U.S. Appl. No. 14/454,452.
Final Office Action dated Sep. 11, 2018 in U.S. Appl. No. 14/339,284.
Final Office Action dated Sep. 12, 2017 in U.S. Appl. No. 14/318,091.
Final Office Action dated Sep. 22, 2016 in U.S. Appl. No. 14/469,230.
Final Office Action dated Oct. 2, 2017 in U.S. Appl. No. 14/469,230.
Final Office Action dated Nov. 10, 2016 in U.S. Appl. No. 14/284,817.
Final Office Action dated Dec. 29, 2017 in U.S. Appl. No. 14/339,284.
International Preliminary Report on Patentability dated Feb. 25, 2016 in Application No. PCT/US2015/041940.
International Preliminary Report on Patentability dated Mar. 28, 2016 in Application No. PCT/US2015/051693.
International Search Report and Written Opinion dated Oct. 23, 2015 in Application No. PCT/US2015/041940.
International Search Report and Written Opinion dated Dec. 30, 2015 in Application No. PCT/US2015/051693.
Non-Final Office Action dated Jan. 14, 2019 in U.S. Appl. No. 15/154,106.
Non-Final Office Action dated Jan. 28, 2019 in U.S. Appl. No. 14/454,452.
Non-Final Office Action dated Feb. 9, 2018 in U.S. Appl. No. 14/318,091.
Non-Final Office Action dated Mar. 9, 2018 in U.S. Appl. No. 14/995,052.
Non-Final Office Action dated Mar. 11, 2016 in U.S. Appl. No. 14/469,230.
Non-Final Office Action dated Mar. 24, 2017 in U.S. Appl. No. 14/318,091.
Non-Final Office Action dated Apr. 14, 2017 in U.S. Appl. No. 14/469,230.
Non-Final Office Action dated May 23, 2018 in U.S. Appl. No. 14/339,284.
Non-Final Office Action dated Jun. 10, 2019 in U.S. Appl. No. 14/995,052.
Non-Final Office Action dated Jun. 17, 2019 in U.S. Appl. No. 15/338,654.

(56) References Cited

OTHER PUBLICATIONS

Non-Final Office Action dated Jul. 7, 2016 in U.S. Appl. No. 14/284,817.
Non-Final Office Action dated Jul. 14, 2017 in U.S. Appl. No. 14/339,284.
Non-Final Office Action dated Aug. 12, 2016 in U.S. Appl. No. 14/454,452.
Non-Final Office Action dated Aug. 16, 2017 in U.S. Appl. No. 14/515,813.
Non-final Office Action dated Sep. 27, 2018 in U.S. Appl. No. 15/237,141.
Non-Final Office Action dated Oct. 2, 2017 in U.S. Appl. No. 14/454,452.
Non-Final Office Action dated Oct. 3, 2019 in U.S. Appl. No. 15/442,945.
Non-Final Office Action dated Nov. 14, 2017 in U.S. Appl. No. 14/284,817.
Non-Final Office Action dated Nov. 17, 2016 in U.S. Appl. No. 14/339,284.
Non-Final office Action dated Nov. 21, 2018 in U.S. Appl. No. 14/515,813.
Notice of Allowance dated Mar. 31, 2019 in U.S. Appl. No. 14/318,091.
Notice of Allowance dated Jun. 27, 2018 in U.S. Appl. No. 14/469,230.
Notice of Allowance dated Aug. 16, 2019 in U.S. Appl. No. 15/237,141.
Notice of Allowance dated Dec. 26, 2018 in U.S. Appl. No. 14/339,284.
Office Action dated Jan. 19, 2018 in Australian Application No. 2017201307.
Office Action dated Apr. 25, 2016 in Canadian Application No. 2,888,085.
Office Action dated Jul. 11, 2018 in Australian Application No. 2017201307.
U.S. Appl. No. 14/454,452, filed Aug. 7, 2014 and entitled System and Method for Providing a Micro Registry.

* cited by examiner

Card Selection & Transaction

LINKING A CONTEXT ENVIRONMENT TO A CONTEXT SERVICE

CROSS REFERENCE TO RELATED APPLICATIONS

This application claims priority to, and the benefit of, U.S. Ser. No. 16/447,395, filed on Jun. 20, 2019 and entitled "LINKING A CONTEXT ENVIRONMENT TO A CONTEXT SERVICE," which is a continuation of, claims priority to, and the benefit of, U.S. Non-Provisional Ser. No. 14/318,091, filed Jun. 27, 2014 and entitled "SYSTEM AND METHOD FOR CONTEXTUAL SERVICES EXPERIENCE." All of which are hereby incorporated by reference in their entireties for all purposes.

FIELD

The present disclosure relates to systems and methods for delivering customer contextual services experiences, and more specifically, delivering customer contextual services experiences based at least in part on a context environment.

BACKGROUND

Typical point-of-sale systems may provide purchase amount information and a mechanism for swiping a payment card. However, these point-of-sale systems typically present the same user experience regardless of the customer context environment.

Typical customer promotions are delivered independently of customer transactions by mass mailing, or by electronic advertising. These customer promotions also typically require a customer to locate the promotion, remember its terms, and manually request it to be applied to a transaction at the point-of-sale.

SUMMARY

A system, method, and computer readable medium (collectively, the "System") for administering contextual services experiences may include a services repository having a database of contextual services and a contextual services delivery module. The contextual services delivery module may have a merchant linkage database having directives indicating which of the contextual services to provide, in response to a context environment. The contextual services delivery module may also have a context database having context characteristics representing the context environment.

The contextual services delivery module may further include a contextual services delivery processor configured to identify the context environment in response to the context characteristics and to provide the executed contextual services from the services repository in response to the directives.

The services repository may be communicates with the contextual services delivery module, and the contextual services delivery module may provide a user with a contextual services experience, in response to the context environment. The contextual services delivery system may also have a network configured to communicate with a smartphone.

The contextual services delivery system may also have a network configured to communicate with a point of sale terminal. Moreover, the contextual services may include transactional services, display services, and authentication services. The transactional services may include a delivery of inventory data, an offer of sale, a sale of a good, and a proposed discount. The display services may include a textual information presentation, a graphical information presentation, and an invitation to complete a transaction via a smart phone and/or a POS terminal.

In various embodiments, the authentication services may include mechanisms of confirming a user identity such as biometric authentication (e.g., fingerprinting), a payment card swipe, a pin number, an identification photograph, and a user location.

The context characteristics may include information provided by third parties such as merchants, social media, credit reporting agencies, and/or payment processors. The context characteristics may include internal data such as a risk analysis of a user, stores visited by the user, a transaction history of the user, a date and time of transactions, an amount of spend per transaction, a frequency of transactions, a number of transactions, and a categorization of transactions. The context environment may include triggers comprising a user location and a user payment status.

A method of consummating a transaction between a user and a merchant is also disclosed. The method may include evaluating, by a merchant linking engine, a merchant linkage database in response to a customer selecting a product, wherein the selecting includes a context characteristic of a context environment. The method also may include identifying, by the merchant linking engine, whether the context environment links to a merchant service and applying, by a promotions engine, a promotion in response to the identifying. Moreover, the method may include determining, by a settlement engine, a payment amount for the product, distributing, by a distribution engine, a payment amount to the user, and receiving, by a settlement engine, a transaction authentication comprising a user fingerprint. Finally, the method may include processing, by the settlement engine, the transaction in response the receiving, and transmitting, by the distribution engine, a transaction confirmation.

The method may include transmitting, via the distribution engine, the payment amount to a smartphone, and transmitting, via the distribution engine, the payment amount to a POS terminal.

The method may include distributing, via the distribution engine, a discount offer to at least one of: a smartphone or a point-of-sale terminal, receiving, via the distribution engine, an acceptance of the discount offer, storing, via the promotions engine, the acceptance of the discount offer, and applying, via the settlement engine, the discount offer to the payment amount in response to the storing.

The method may include distributing, via the distribution engine, an upsell opportunity to at least one of: a smartphone or a point-of-sale terminal, receiving, via the distribution engine, an acceptance of the upsell opportunity, storing, via the promotions engine, the acceptance of the upsell opportunity, and distributing, via the distribution engine, a modified payment amount in response to the storing.

The method may also include distributing, via the distribution engine, a discount offer to at least one of: a smartphone or a point-of-sale terminal, distributing, via the distribution engine, an upsell opportunity to at least one of: a smartphone or a point-of-sale terminal, receiving, via the distribution engine, an acceptance of the discount offer, receiving, via the distribution engine, an acceptance of the upsell opportunity, storing, via the promotions engine, the acceptance of the discount offer, storing, via the promotions engine, the acceptance of the upsell opportunity, applying, via the distribution engine, the discount offer to the payment amount in response to the storing, and distributing, via the distribution engine, a modified payment amount in response to the storing.

The method may further include identifying, via the promotions engine, a plurality of transaction accounts in response to the identifying, and receiving, via a settlement engine, a transaction account choice comprising a selected transaction account from among the plurality of transaction accounts. The processing may further include applying the transaction against the selected transaction account in response the receiving.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

The detailed description of exemplary embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Figure 1A:
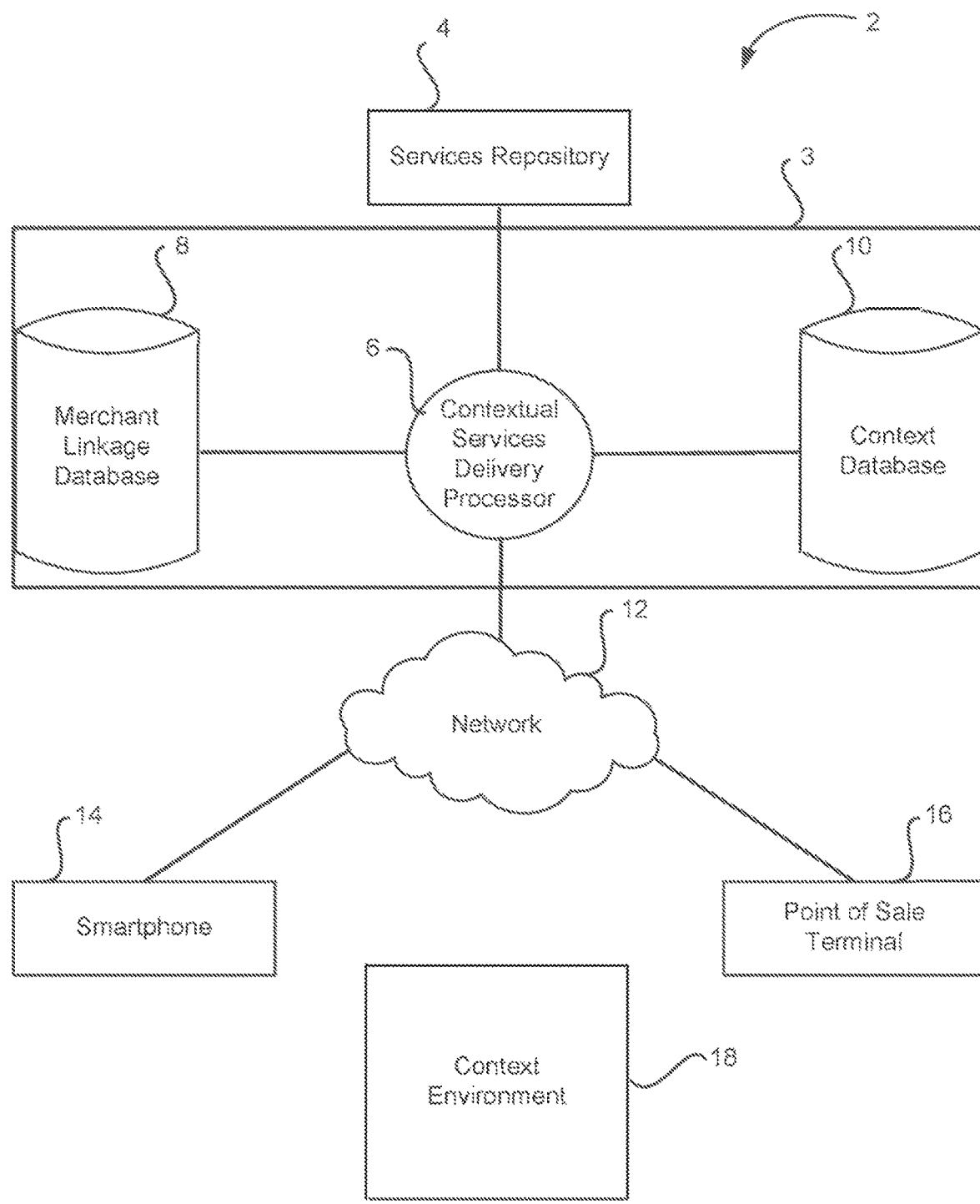
FIG. 1A is a block diagram illustrating various system components of a contextual services delivery system, in accordance with various embodiments.

With reference to FIG. 1A, a context environment 18 may include the user location, such as whether a user is located at a POS terminal 16, whether a user has just entered a store, and/or a user's general or specific location within a store. The context environment 18 may include a user payment status (e.g., whether a user has swiped a payment card, or authorized a payment on a smartphone 14), may include whether a user has opened an application on a smartphone 14, may include whether a user has scanned a product SKU, and/or any other information regarding the actions of a user. The context environment 18 comprises any characteristic related to the user, and/or historical information, and may include a past transaction by the user, and/or a potential future transaction by the user. Some or all of the context environment data may be stored in the context database 10.

In various embodiments, and with reference to FIG. 1A, a contextual services delivery system 2 may comprise a point-of-sale terminal ("POS" or "POS terminal") 16, a smartphone 14, a network 12, a services repository 4, and a contextual services delivery module 3 comprising a merchant linkage database 8, a contextual services delivery processor 6, and a context database 10. POS terminal 16 may be in communication with and/or operatively coupled to (e.g., in "logical communication" with) contextual services delivery module 3 via network 12. Similarly, smartphone 14 may be in communication with and/or operatively coupled to contextual services delivery module 3 via network 12.

Network 12 may be any suitable payment network including, for example, the Internet, the American Express® Network, the Visa® network, the MasterCard® network, the Discover® card network, and/or the like. In this regard, network 12 may be configured to receive transaction information from POS terminal 16 and/or smartphone 14 and/or an entity capable of gathering transaction information from POS terminal 16 and/or smartphone 14. Moreover, network 12 may be configured to facilitate the communications of the transaction information from POS terminal 16 and/or smartphone 14 to the contextual services delivery module 3 in substantially real time. In this regard, network 12 may be capable of and/or configured to facilitate an authorization of a transaction initiated at POS terminal 16 and/or smartphone 14. In various embodiments, network 12 may include at least a portion of POS terminal 16 and/or smartphone 14 and/or contextual services delivery module 3, or at least a portion of the functions of POS terminal 16 and/or smartphone 14 and/or contextual services delivery module 3.

Phrases similar to a "contextual services delivery system" (e.g., contextual services delivery system 2) may include a company (e.g., a third party) appointed (e.g., by a merchant) to handle transactions (a "payment processor"). A payment processor may include an issuer, acquirer, authorizer, network 12 and/or any other system or entity involved in the transaction process, and/or at least a portion of the functions of such entities. Payment processors may be broken down into two types: front-end and back-end. Front-end payment processors have connections to various transaction accounts and supply authorization and settlement services to the merchant banks' merchants. Back-end payment processors accept settlements from front-end payment processors and, via The Federal Reserve Bank, move money from an issuing bank to the merchant bank. In an operation that will usually take a few seconds, the payment processor will both check the details received by forwarding the details to the respective account's issuing bank or card association for verification, and may carry out a series of anti-fraud measures against the transaction. Additional parameters, including the account's country of issue and its previous payment history, may be used to gauge the probability of the transaction being approved. In response to the payment processor receiving confirmation that the transaction account details have been verified, the information may be relayed back to the merchant, who will then complete the payment transaction. In response to the verification being denied, the payment processor relays the information to the merchant, who may then decline the transaction.

Phrases similar to a "payment gateway" or "gateway" may include an application service provider service that authorizes payments for e-businesses, online retailers, and/or traditional brick and mortar merchants. The gateway may be the equivalent of a physical point of sale terminal located in most retail outlets. A payment gateway may protect transaction account details by encrypting sensitive information, such as transaction account numbers, to ensure that information passes securely between the customer and the merchant and also between merchant and payment processor.

In various embodiments, a user may be capable of interacting with POS terminal 16, network 12, and/or a smartphone 14. For example, a user may interact with POS terminal 16 (e.g., a merchant, a website, an app, a virtual point of sale, a physical point of sale, an iPad® having an installed app, and/or the like) to initiate a transaction. Similarly, a user may interact with smartphone 14 to initiate a transaction. Moreover, a user may interact with a POS terminal 16 and/or a smartphone 14 to settle a transaction, fund a transaction, or otherwise communicate with the contextual services delivery module 3, and/or the like.

In various embodiments, a user may interact with a contextual services delivery system 2 by registering with a payment processor, or network 12, or the contextual services delivery processor 6. In operation, payment processor or network 12, or the contextual services delivery processor 6 may be capable and/or configured to facilitate authorization and/or settlement of transactions by analyzing information from POS terminal 16 and/or smartphone 14, as well as other information available at the contextual services delivery processor 6. However, networks may not be capable of and/or configured to monitor, track, record, and/or count the number of transactions associated with a particular user. Moreover, the transaction information communicated between a point of sale and payment processor may not be sufficient to particularly identify a user by a network.

In various embodiments, contextual services delivery module 3 and/or network 12 may be capable of providing a contextual services experience. In this manner, the contextual services delivery system 2 provides a contextual services experience to users. For simplicity, the disclosure will discuss operations by contextual services delivery module 3, but one skilled in the art will appreciate that network 12 may perform one or more of the functions.

In various embodiments and with continuing reference to FIG. 1A, a POS terminal 16 may comprise a computer, a tablet, for example, an iPad®, a terminal, or any other device or system whereby a transaction may be initiated. For example, a POS may comprise any device, interface, or merchant, a website, an app, a virtual point of sale, or a physical point of sale. A POS terminal 16 may have various different input and output capabilities. For example, a POS terminal 16 may comprise a plain-text display, may comprise a graphical display, or may comprise a rich audio-visual user interaction mechanism.

A smartphone 14 may comprise a portable device whereby a user may interact with the contextual services delivery module 3. For example, a smartphone 14 may comprise a phone, a tablet, for example, an iPad®, a laptop, or any other suitable electronic device. In various embodiments, a smartphone 14 comprises an iPhone®, a Blackberry®, a device running an Android® operating system, a Nokia® phone, a Windows® phone, or any other data access and/or telephony device.

A services repository 4 may be communicates with the contextual services delivery module 3. The services repository 4 may comprise a database containing contextual services comprising instructions which, when executed by the contextual services delivery processor 6 of the contextual services delivery module 3, cause the contextual services delivery processor 6 to deliver various different contextual services experiences to a smartphone 14 and/or a POS terminal 16. A contextual services experience may comprise any combination of contextual services. A services repository 4 may comprise contextual services comprising transactional services, display services, and authentication services. In this manner, a user's interactions with a smartphone 14 and/or a POS terminal 16 may be customized.

Finally, as mentioned previously, a contextual services delivery system 2 may comprise a contextual services delivery module 3 configured to deliver a contextual services experience to a user via a smartphone 14 and/or a POS terminal 16. A contextual services delivery module 3 may comprise a merchant linkage database 8, a contextual services delivery processor 6, and a context database 10. A contextual services delivery module 3 may identify a context environment 18 and may deliver a contextual services experience comprising contextual services from services repository 4 to a smartphone 14 and/or a POS terminal 16, in response to a context environment 18, and in accordance with various methods.

A merchant linkage database 8 may comprise a public or private repository of information provided by a merchant. For example, a merchant may wish to provide various types of users with various contextual services experiences. The merchant linkage database 8 may comprise instructions ("directives") indicating which contextual services from services repository 4 to provide to deliver a contextual services experience, in response to different context environments 18. The merchant linkage database 8 may be in electronic and/or logical communication with the contextual services delivery processor 6. Thus, the merchant linkage database 8 may be said to contain records of linkages between different context characteristics (from context database 10) and different contextual services (from services repository 4) and may be accessed by the contextual services delivery processor 6, for example, in order to determine which contextual services experience to provide in response to different context environments 18. Moreover, the contextual services experience may be delivered in real time or substantially real time. For instance, the contextual services experience may be delivered in response to a present context environment 18. Furthermore, the directive may comprise dynamic instructions to deliver a contextual services experience in response to a present context environments 18 with consideration for past context environments 18, past contextual services delivered, and/or past consumer responses, for example, whether a consumer entered a transaction, accepted/rejected an offer and/or upsell, and the like. Thus, the merchant linkage database 8 may comprise directives comprising machine learning instructions. Similarly, the context environment 18 may be said to be path-dependent, for example, it may account for previous context environments 18 and/or consumer behaviors.

A context database 10 may comprise a public or private repository of information provided by various sources. A context database 10 may comprise stored context characteristics. For example, a context database 10 may comprise information provided by third parties such as merchants, social media, credit reporting agencies, payment processors, and internal data (e.g., risk analysis, analytics, name of stores visited by different users, and transaction history). The context database 10 may comprise context characteristics, such as transactions, and data regarding transactions (e.g., location, date, and time of transaction), present location, past location, proximity sensing data, such as iBeacon® data, amount spent, merchant, frequency of transactions, number of transactions, transaction categorizations, etc.

For example, context characteristics may comprise an activity in a social media channel (e.g., a Tweet). Examples of social media channels include Facebook®, Foursquare®, Twitter®, My Space®, LinkedIn®, and the like. In response to activity in the social media channel, various context characteristics may be stored, for example, an individual's comments in a social media channel toward a particular retailer. For example, an individual who comments about retailers in a particular market segment may be of interest to other retailers in that same market segment, and thus this activity may be of interest to store as context characteristics. Similarly, context characteristics may comprise an activity in an entertainment channel (e.g., xBox®) or a review channel (e.g., TripAdvisor®), or activity in a reservation channel (e.g., OpenTable®), or may comprise any activity or combination of activities.

Some or all of the information comprising a context environment 18 may be stored in the context database 10 for access by the contextual services delivery processor 6. It may also be said that some or all of the information comprising a context environment 18 may be provided by a smartphone 14 and/or a POS terminal 16 and stored in the context database 10. The context database 10 may communicate with the contextual services delivery processor 6. Thus, the contextual services delivery processor 6 may access the context database 10 to identify different context characteristics in order to provide various types of users with various contextual services (and thus various contextual services experiences).

A contextual services delivery system 2 may operate within a context environment 18. A context environment 18 comprises various potential triggers (e.g., user location, proximity sensing data, such as iBeacon® data, payment status, transaction, past user behavior, past context environments 18, past contextual services delivered to a user, past contextual services delivery system 2 operations of any sort, past user behavior following the delivery of past contextual services, past user behavior following the delivery of past contextual services in view of past context environments 18, and the like) that, upon detection, trigger the contextual services delivery system 2 to execute various methods.

Thus, the contextual services delivery module 3 may deliver contextual services from a services repository 4 to a smartphone 14 and/or a POS terminal 16, in response to processing by a contextual services delivery processor 6, wherein context characteristics from a context database 10 are assessed in comparison to a merchant linkage database 8. In response to a context environment 18 triggering the contextual services delivery module 3 to deliver contextual services, the contextual services delivery module 3 may determine a correspondence between data from the context database 10 with an instruction from a merchant linkage database 8 corresponding to this data and directing the provision of various services. Thus, the contextual services delivery processor 6 may provide various services to the smartphone 14 and/or the POS terminal 16.

In further embodiments, the contextual services delivery module 3 may deliver contextual services based on a determined correspondence which incorporates and/or is responsive to machine learning directives as previously discussed. For example, the correspondence may account for past context environments 18, past contextual services from a services repository 4 delivered by the contextual services delivery module 3, external data, such as past consumer purchases or past consumer social media posts, and/or past consumer interactions with the contextual services delivery system 2, and the like.

Thus one may appreciate that the contextual services delivery module 3 and/or any other component of the contextual services delivery system 2 may implement machine learning techniques, for example, supervised learning techniques, and/or unsupervised learning techniques. In this manner, the contextual services delivery system 2 may dynamically respond to context environments 18 and may respond differently to different consumers, or differently to a given consumer in a given context environment 18 in view of that consumer's changing behavior and/or past behavior, purchases, social media posts, etc. Thus the contextual services delivery module 3 may deliver contextual services from a services repository 4 to smartphone 14 and/or a POS terminal 16, in response to processing by a contextual services delivery processor 6, wherein the processing includes machine learning algorithms and also accounts for past consumer behavior and past contextual services delivery system 2 behavior. As such, the contextual services delivered may be tailored to each context environment 18, accounting for historical data and performance. The contextual services delivery module 3 may determine a correspondence between data from the context database 10 with an instruction from a merchant linkage database 8 corresponding to this data and directing the provision of various services. As such, a feedback loop may be established among consumer behavior, the response of the contextual services delivery module 3 in selecting contextual services from a services repository 4 for delivery in response to a present context environment 18 and the data stored in the context database 10 and/or other sources of data, including historical data.

For example, a consumer who has previously purchased dry wall may be provided with contextual services suggesting that the consumer purchase paint whenever he or she enters a home improvement store. Moreover, the contextual services delivery system 2 may be aware that a competing store provides better prices on comparable paint based on historical data collected over time. Thus, in further embodiments, the consumer may be provided with contextual services suggesting that the consumer purchase paint at a competing store. Alternatively, the consumer may be provided with contextual services comprising an opportunity to request that the paint be prepared and held in store, or may be provided a map to the appropriate aisle, for example, on a smartphone 14.

The contextual services delivery module 3 may consider, for example, available products, social media activity, such as Facebook® activity and/or Twitter® activity, activity of other users, activity of other merchants, activity of the instant user, activity of an instant merchant, American Express® internal data, SKU data, sentimental analysis of data such as social media activity to determine individual or collective sentiments regarding products and/or merchants, etc., and may determine contextual services to delivery to a user. Moreover, different contextual services may be ranked for a user in view of user behavior, American Express® internal data, and merchant linkage database 8 data, and may be delivered based on different context environments 18 according to machine learning processes as discussed.

With renewed focus on services repository 4, services repository 4 may comprise contextual services comprising transactional services, display services, and authentication services. In this manner, a user's interactions with a smartphone 14 and/or a POS terminal 16 may be customized. Moreover, these interactions may be customized in real time or substantially real time, e.g., they may be customized as (or close to when) they occur.

Contextual services may comprise transactional services. Transactional services may include the delivery of information regarding available inventory, the sale of an item, an offer to sell an item, an offer to sell a related and/or complementary good or service, an offer to sell a competing good or service, an proposed discount, the identification of a user's location and the delivery of other transactional services in response there to (e.g., the identification of a user's location by triangulation and/or iBeacon® systems, and or proximity sensing data), Bluetooth low energy communication systems, GPS systems, near-field communication systems, the invitation to purchase a warranty, and/or tracking of SKUs purchased or considered for purchase. In various embodiments, different contextual services may be available depending on the technical capabilities of a POS terminal 16 and/or a smartphone 14. For example, a user whose location is identified as being at a POS terminal 16 may receive real-time updates (of purchased products, complementary products, upsell products, product information, etc.) displayed on the smartphone 14 as a store clerk scans the items being purchased. Moreover, a user whose location is identified as being at a POS terminal 16 may receive real-time updates targeted to the individual and/or in view of a context environment 18.

Similarly, the contextual services may comprise display services. Display services may include a textual information presentation, a graphical information presentation, an invitation to determine an item for purchase via a smartphone 14, an invitation to complete a transaction via a smartphone 14, and/or an invitation to complete a transaction via a point-of sale terminal. In various embodiments, different contextual services may be available depending on the technical capabilities of a POS terminal 16 and/or a smartphone 14. For example, a POS terminal 16 lacking a graphical display may receive a textual information presentation, but not a graphical information presentation.

Furthermore, the contextual services may comprise authentication services. In various embodiments, authentication services comprise various mechanisms whereby an action is approved by a user and the identity of the user is confirmed. For example, authentication services may comprise biometric authentication (e.g., fingerprint information), payment card swipe, entry of a pin number, identification of a photograph, and/or identification of a user by that user's location. For example, a user may be authenticated by identification of a photograph, wherein the POS terminal 16 presents a stored photograph of the user and invites the clerk to verify that the person purchasing the items resembles the person in the photograph. In various embodiments, a user may be authenticated by identification of a user by that user's location, wherein the location of the user's smartphone 14 is determined to be at the front of a checkout line, and a pending transaction is associated with the user for payment.

In order for contextual services delivery module 3 to provide contextual services to a user, contextual services delivery module 3 may provide and/or allow the user to register with the contextual services delivery module 3. Network 12 may request information from a user, including, for example, a transaction account number, a transaction account identifier, and/or the like. This information provided by the user may allow and/or enable contextual services delivery module 3 to identify, track, count, and/or otherwise monitor transaction information and/or information indicative of a transaction that is passed between POS terminal 16 and/or smartphone 14, and the contextual services delivery module 3 by network 12.

In various embodiments, contextual services delivery module 3 may be able to particularly identify and/or associate one or more transactions with a particular user. Moreover, information provided by a user may be used by contextual services delivery module 3 to particularly identify transactions routed between POS terminal 16 and contextual services delivery module 3 by network 12.

Figure 2:
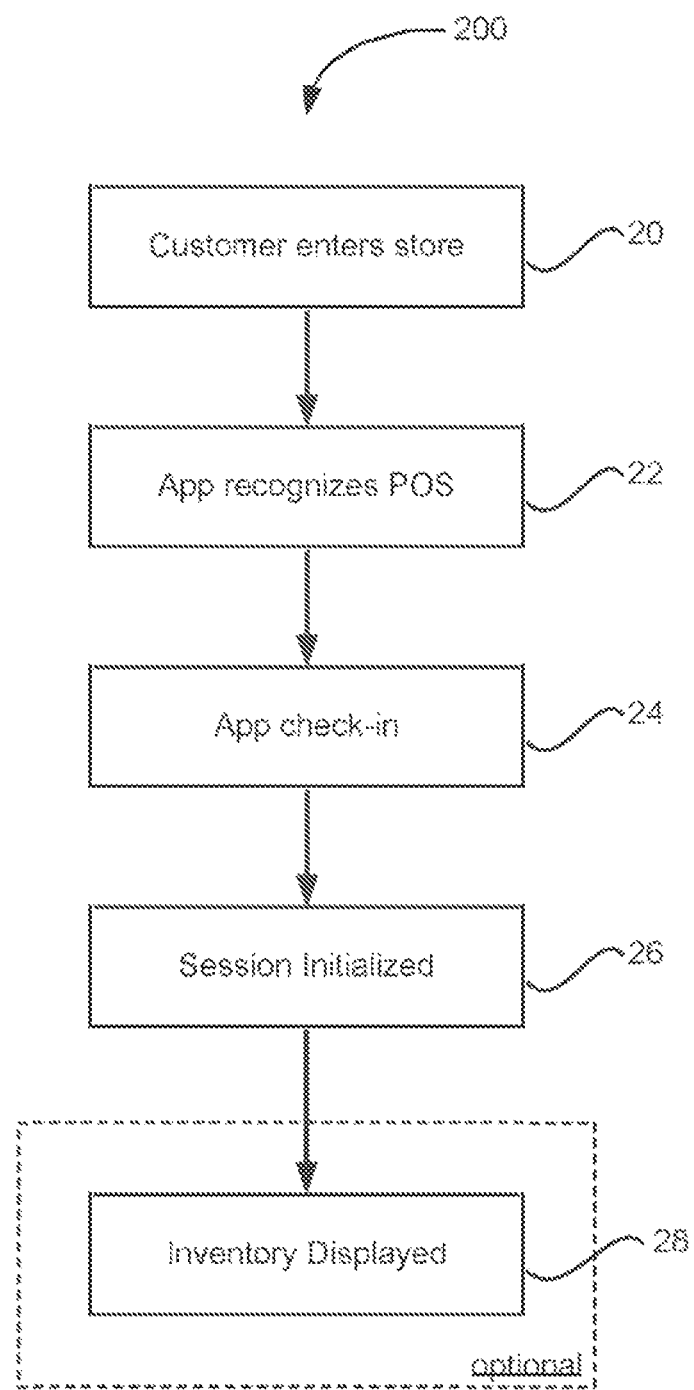
FIG. 2 illustrates a process flow for initializing a user session prior to delivering services, in accordance with various embodiments.

With reference to FIG. 2, contextual services delivery module 3 may be able to identify a customer upon his or her entry into a store. In this manner, the contextual services delivery module 3 may open a session with the user. For example, a method of instantiating a user session 200 may include a customer entering a store (Step 20). An application on the user's smartphone 14 may recognize a POS terminal 16 in the store, for example by Bluetooth Low Energy ("BLE") communication, by cellular communication, by Wi-Fi communication, by Near-Field Communication ("NFC"), or by any IEEE 802 standard communications technology, or by comparing location data derived from the user's smartphone 14, or derived via triangulation to a database of stores having POS terminals capable of instantiating a user session 200, or by any other method. (Step 22). Subsequently, the application may communicate with the POS terminal 16, identify itself and thus may be said to "check-in" with the POS terminal 16. (Step 24). A session is subsequently established between the POS terminal 16 and the smartphone 14, wherein each is aware of the other's presence and information, such that contextual services may be exchanged. For instance, in various embodiments, a subset or all of a store's inventory data may optionally be displayed on the smartphone 14 (Step 28).

Such inventory data may be searchable, provide comparisons to other inventories, associate items, determine complementary items, analyze competing items, etc. The user may be further permitted to pay for items, ship items, may be directed to a store having the items and/or a location within the store where the items are located, and/or to direct that items be held for in-store pickup. As a result, an online presence may be provided for a store that otherwise would lack a website or online purchasing and/or inventory searching mechanisms.

Moreover, in further embodiments, such data, as well as any functionality or features of the methods and systems disclosed herein may be delivered to a user via network 12 regardless of that user's location. For example, a user may be permitted access to inventory data via a smartphone 14, and/or a web browser, regardless of whether the user is physically in the store.

Figure 1B:
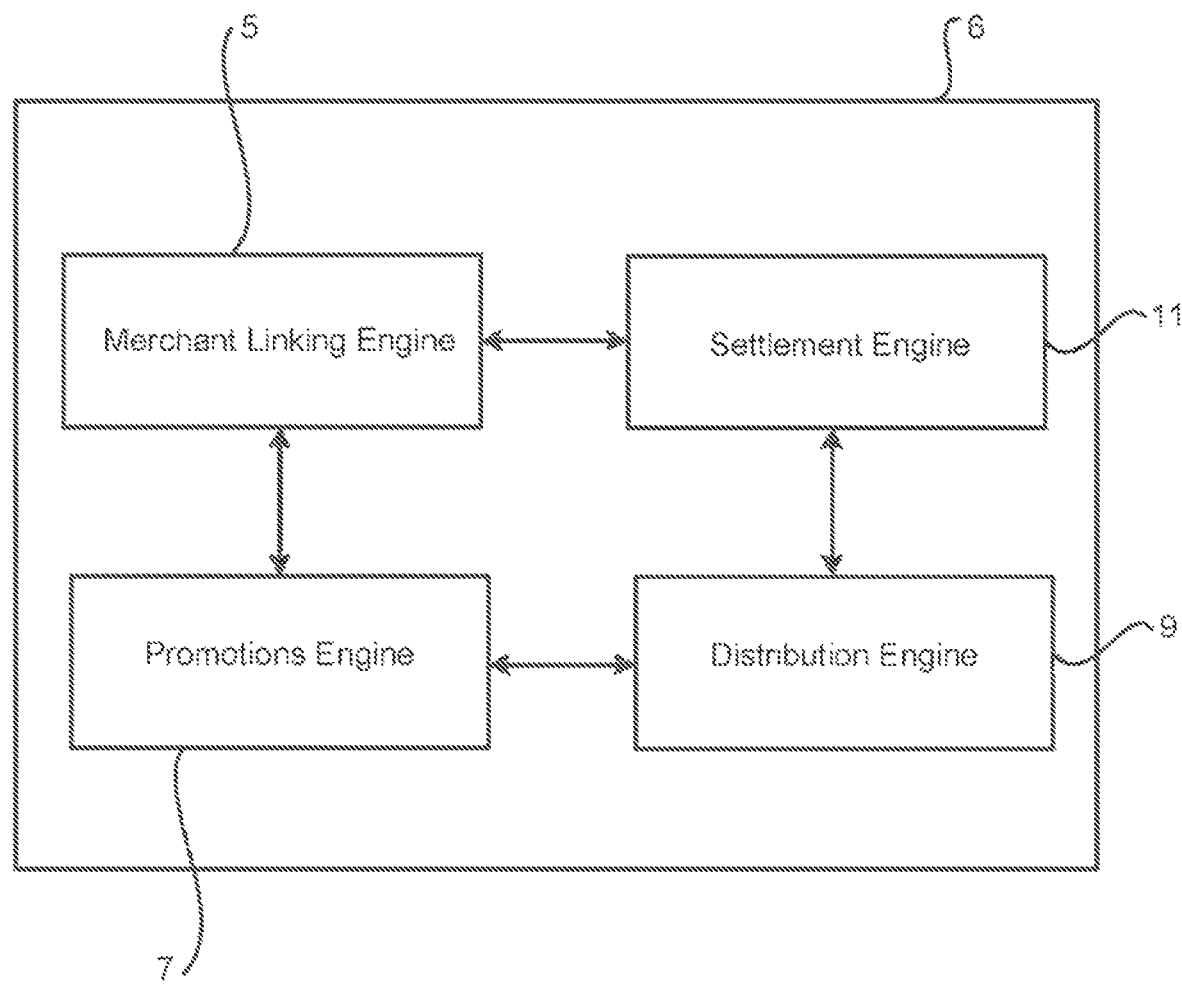
FIG. 1B is a block diagram illustrating various system components of a contextual services delivery processor, in accordance with various embodiments.

With reference to FIG. 1B, various methods may be performed by various different components of the contextual services delivery processor 6. For example, the processor may comprise a merchant linking engine 5, a promotions engine 7, a distribution engine 9, and a settlement engine 11. The various engines may be in communication and may perform various steps of various methods as discussed further herein.

Figure 3:
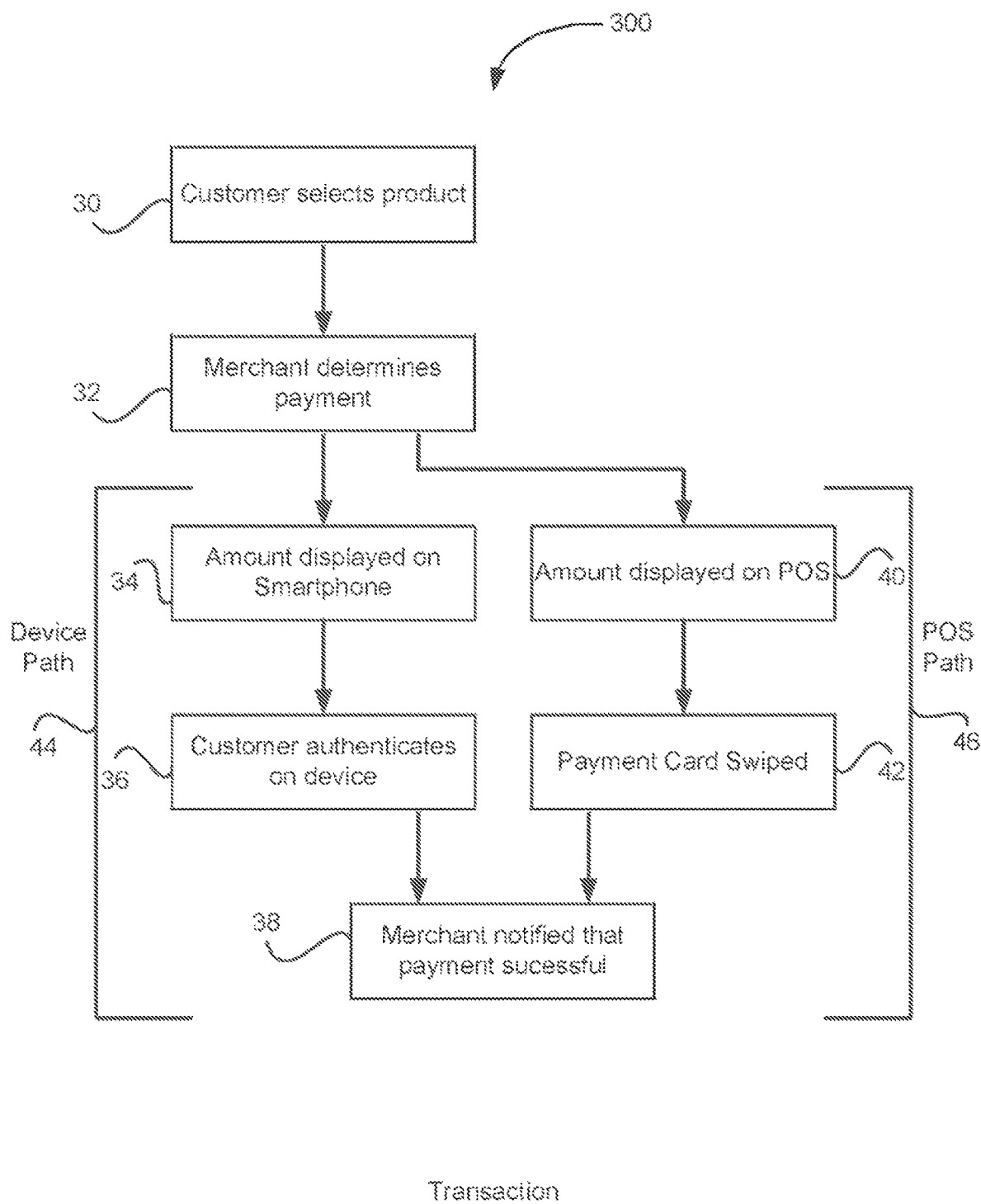
FIG. 3 illustrates a process flow for executing a transaction, in accordance with various embodiments.

With reference to FIGS. 1B and 3, contextual services delivery module 3 may perform a method consummating a transaction between a user and a merchant. For example, a customer may select a product (Step 30). The merchant linking engine 5 of the contextual services delivery processor 6 may evaluate a merchant linkage database 8 in response to the customer selecting a product. This selection by the user may comprise a context characteristic of a context environment 18. Subsequently, the merchant linking engine 5 may identify that the context environment 18 correspondingly links to a context service from services repository 4 that the merchant desires the user to receive ("merchant service"). The merchant linking engine 5 may communicate this information to a promotions engine 7. A promotions engine 7 may apply zero, one, or any number of promotions (e.g., discounts, or purchases of complementary items), in response to this information, and direct a distribution engine 9 to display these promotions to a user. Thus, the merchant may be said to determine a payment amount for that product (Step 32). Subsequently, the distribution engine 9 may display a payment amount to the user. For example, a distribution engine 9 may distribute the information according to a device interaction path 44 and/or a POS interaction path 46. In other words, the distribution engine 9 may display an amount on the user's smartphone 14 (Step 34). In various embodiments, the distribution engine 9 may simultaneously display the amount on a POS terminal 16 (Step 40). In response, a customer may authenticate the transaction on the smartphone 14 (Step 36) (e.g., by an authentication service such as biometric fingerprint authentication) and/or may authenticate the transaction on the POS (Step 42) (e.g., by swiping a payment card in a POS terminal 16). The settlement engine 11 may process the payment information in response and may subsequently transmit a transaction confirmation notifying the merchant, for example, by a message on a POS terminal 16, that payment is successful (Step 38).

At various steps of the process, various different transaction, display, and authentication services may be provided based on different context environments 18. Various steps may be omitted and/or added, and/or various steps may be combined among different methods and embodiments. For example, in various embodiments, a predetermined and/or externally determined payment amount may be determined and/or authenticated and in response, the settlement engine 11 may process the payment information and may subsequently transmit a transaction confirmation notifying the merchant, for example, by a message on a POS terminal 16, that payment is successful.

Figure 4:
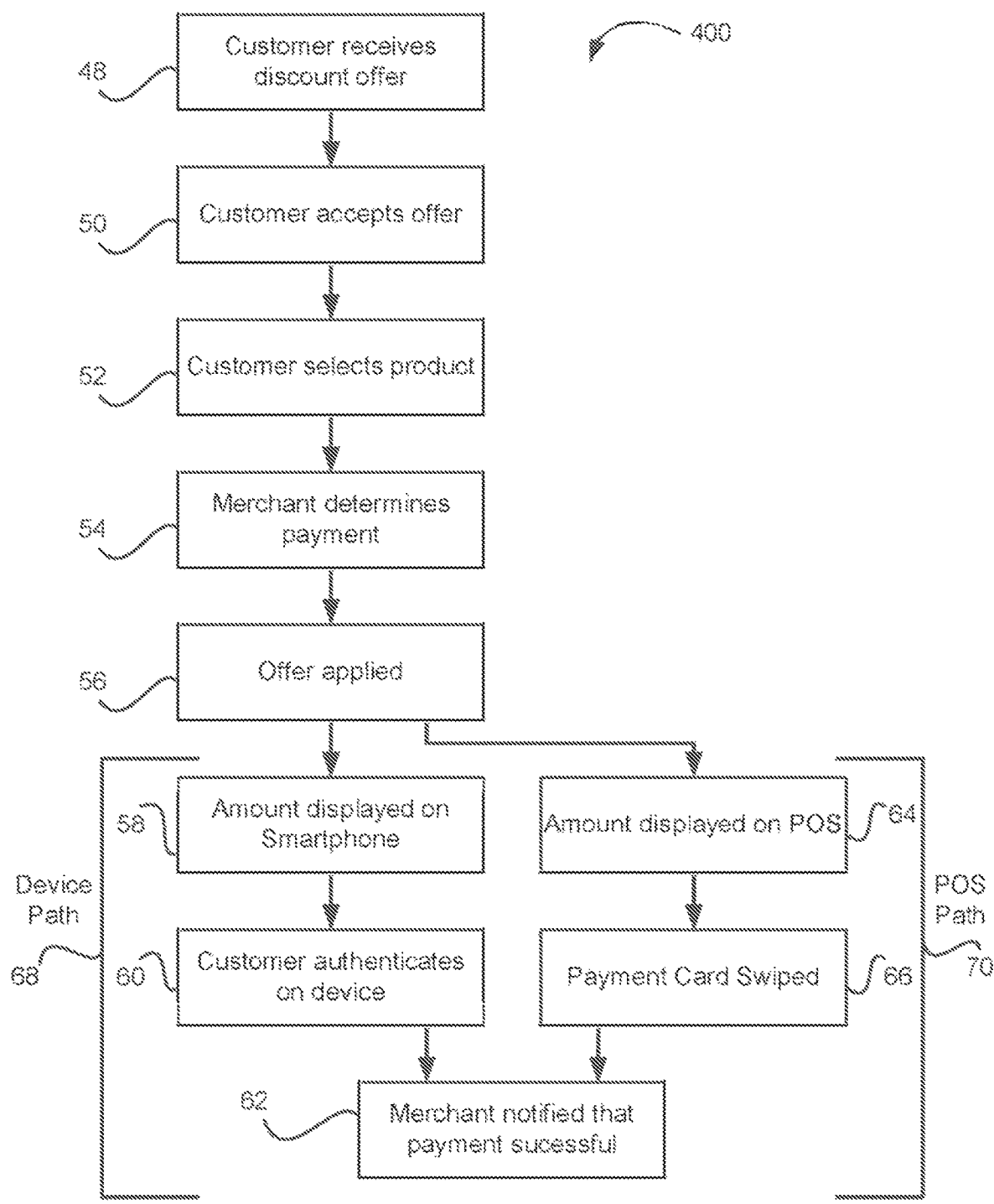
FIG. 4 illustrates a process flow for executing a transaction and delivering an offer, in accordance with various embodiments.

With reference now to FIGS. 1B and 4, contextual services delivery module 3 may perform a method consummating a transaction between a user and a merchant, as well as providing a user with an offer in response based on the context environment 18. For example, contextual services delivery module 3 may perform a method consummating a transaction between a user and a merchant. For example, a merchant linking engine 5 of the contextual services delivery processor 6 may evaluate a merchant linkage database 8 in response to context characteristics comprising a context environment 18. The merchant linking engine 5 may identify that the context environment 18 correspondingly links to a context service from services repository 4 that the merchant linkage database 8 indicates that a merchant desires a user to receive. The merchant linking engine 5 may communicate this information to a promotions engine 7. A promotions engine 7 may apply zero, one, or any number of promotions (e.g., discounts, or purchases of complementary items), in response to this information, and direct a distribution engine 9 to display these promotions to a user. Subsequently, the distribution engine 9 may distribute this information to a customer via display on a smartphone 14 or a POS terminal 16. Thus, the customer may receive a discount offer (Step 48) via a smartphone 14 or a POS terminal 16. The customer may accept this offer (Step 50) by transmitting a message via the smartphone 14 or the POS terminal 16 to the promotions engine 7. The promotions engine 7 may store this acceptance in a non-transitory memory. Subsequently, the customer may select a product (Step 52). The merchant linking engine 5 of the contextual services delivery processor 6 may evaluate a merchant linkage database 8 in response to the customer selecting a product. This selection by the user may comprise a context characteristic comprising a context environment 18. Subsequently, the merchant linking engine 5 may identify that the context environment 18 correspondingly links to a context service from services repository 4 that the merchant linkage database 8 indicates that a merchant desires a user to receive. The merchant linking engine 5 may communicate this information to a promotions engine 7. A promotions engine 7 may apply the previously stored promotion in response to this information. Thus, the merchant may be said to determine a payment amount for that product (Step 54), then apply the offer to that amount (Step 56). Subsequently, the distribution engine 9 may display a payment amount to the user. For example, a distribution engine 9 may distribute the information according to a device interaction path 68 and/or a POS interaction path 70. In other words, the distribution engine 9 may display an amount on the user's smartphone 14 (Step 58). In various embodiments, the distribution engine 9 may simultaneously display the amount on a POS terminal 16 (Step 64). In response, a customer may authenticate the transaction on the smartphone 14 (Step 60) (e.g., by an authentication service such as biometric fingerprint authentication), and/or may authenticate the transaction on the POS (Step 66) (e.g., by swiping a payment card in a POS terminal 16). The settlement engine 11 may process the payment information in response and may subsequently notify the merchant, for example, by a message on a POS terminal 16, that payment is successful (Step 62). At various steps of the process, various different transaction, display, and authentication services may be provided based on different context environments 18.

Figure 5:
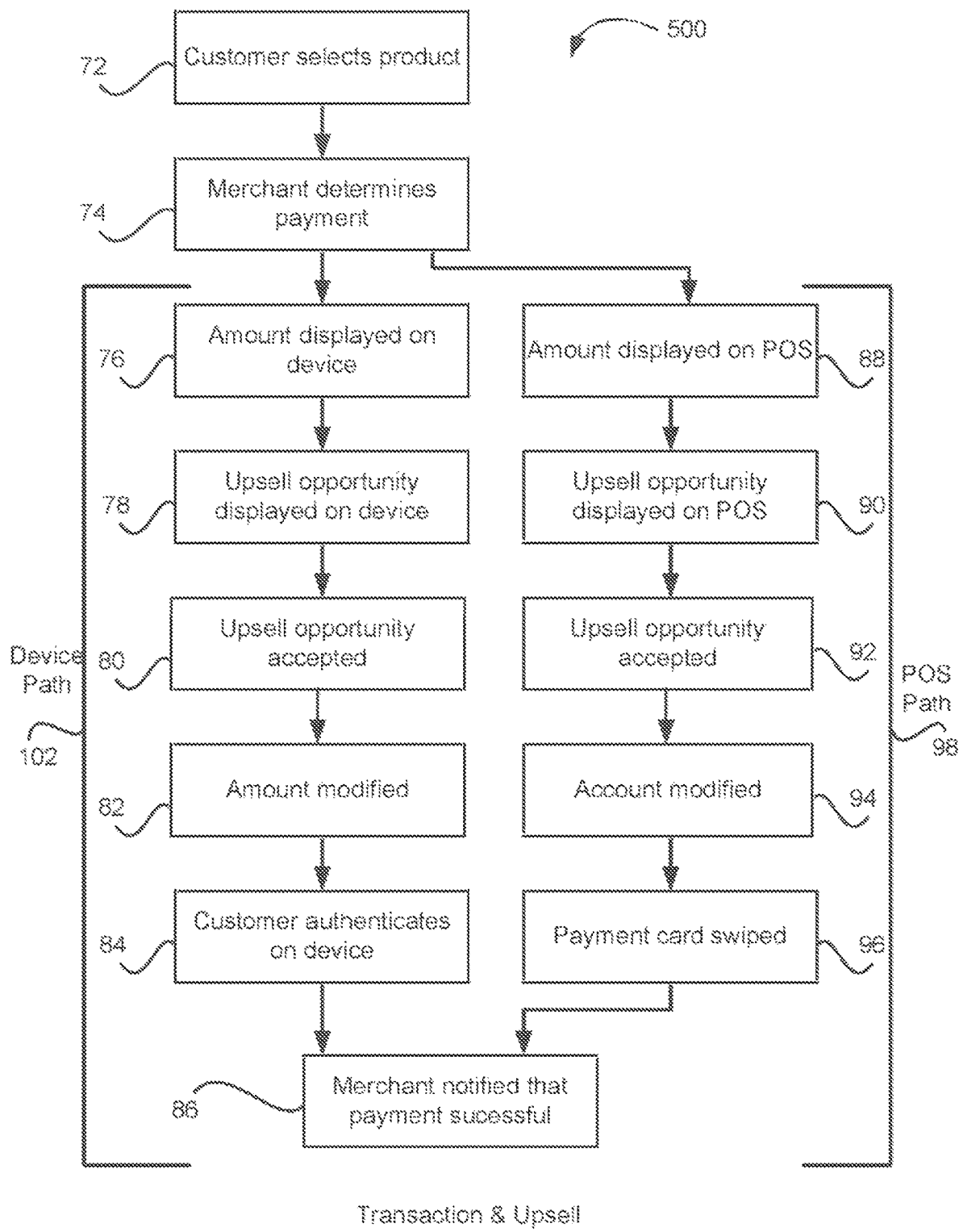
FIG. 5 illustrates a process flow for executing a transaction and delivering an upsell, in accordance with various embodiments.

With reference now to FIGS. 1B and 5, contextual services delivery module 3 may perform a method consummating a transaction between a user and a merchant, as well as providing a user with an upsell in response based on the context environment 18. For example, a customer may select a product (Step 72). The merchant linking engine 5 of the contextual services delivery processor 6 may evaluate a merchant linkage database 8 in response to the customer selecting a product. This selection by the user may comprise a context characteristic comprising a context environment 18. Subsequently, the merchant linking engine 5 may identify that the context environment 18 correspondingly links to a context service from services repository 4 that the merchant linkage database 8 indicates that a merchant desires a user to receive. The merchant linking engine 5 may communicate this information to a promotions engine 7. A promotions engine 7 may apply zero, one, or any number of promotions (e.g., discounts, or purchases of complementary items), in response to this information, and direct a distribution engine 9 to display these promotions to a user. Thus, the merchant may be said to determine a payment amount for that product (Step 74). Subsequently, the distribution engine 9 may display a payment amount to the user. For example, a distribution engine 9 may distribute the information according to a device interaction path 102 and/or a POS interaction path 98. In other words, the distribution engine 9 may display an amount on the user's smartphone 14 (Step 76). In various embodiments, the distribution engine 9 may simultaneously display the amount on a POS terminal 16 (Step 88). Furthermore, the merchant linking engine 5 may identify that the context environment 18 correspondingly links to a context service from services repository 4 that the merchant linkage database 8 indicates that a merchant desires a user to receive. The merchant linking engine 5 may communicate this information to a promotions engine 7. A promotions engine 7 may apply zero, one, or any number of upsell opportunities in response to this information, and direct a distribution engine 9 to display these upsell opportunities to a user via the user's smartphone 14 (Step 78) or via the POS terminal 16 (Step 90). The customer may accept this upsell opportunity (Step 80) by transmitting a message via the smartphone 14 or may accept this upsell opportunity (Step 92) by transmitting a message via the POS terminal 16. The promotions engine 7 may receive this message and may communicate instructions to the distribution engine 9 to distribute a modified payment amount on the user's smartphone 14 (Step 82) and/or the POS terminal 16 (Step 94). In response, a customer may at least one of: authenticate the transaction on the smartphone 14 (Step 84), for example by an authentication service such as biometric fingerprint authentication, and/or may authenticate the transaction on the POS (Step 96), such as by swiping a payment card in a POS terminal 16. The settlement engine 11 may process the payment information in response and may subsequently notify the merchant, for example, by a message on a POS terminal 16, that payment is successful (Step 86). At various steps of the process, various different transaction, display, and authentication services may be provided based on different context environments 18.

Figure 6:
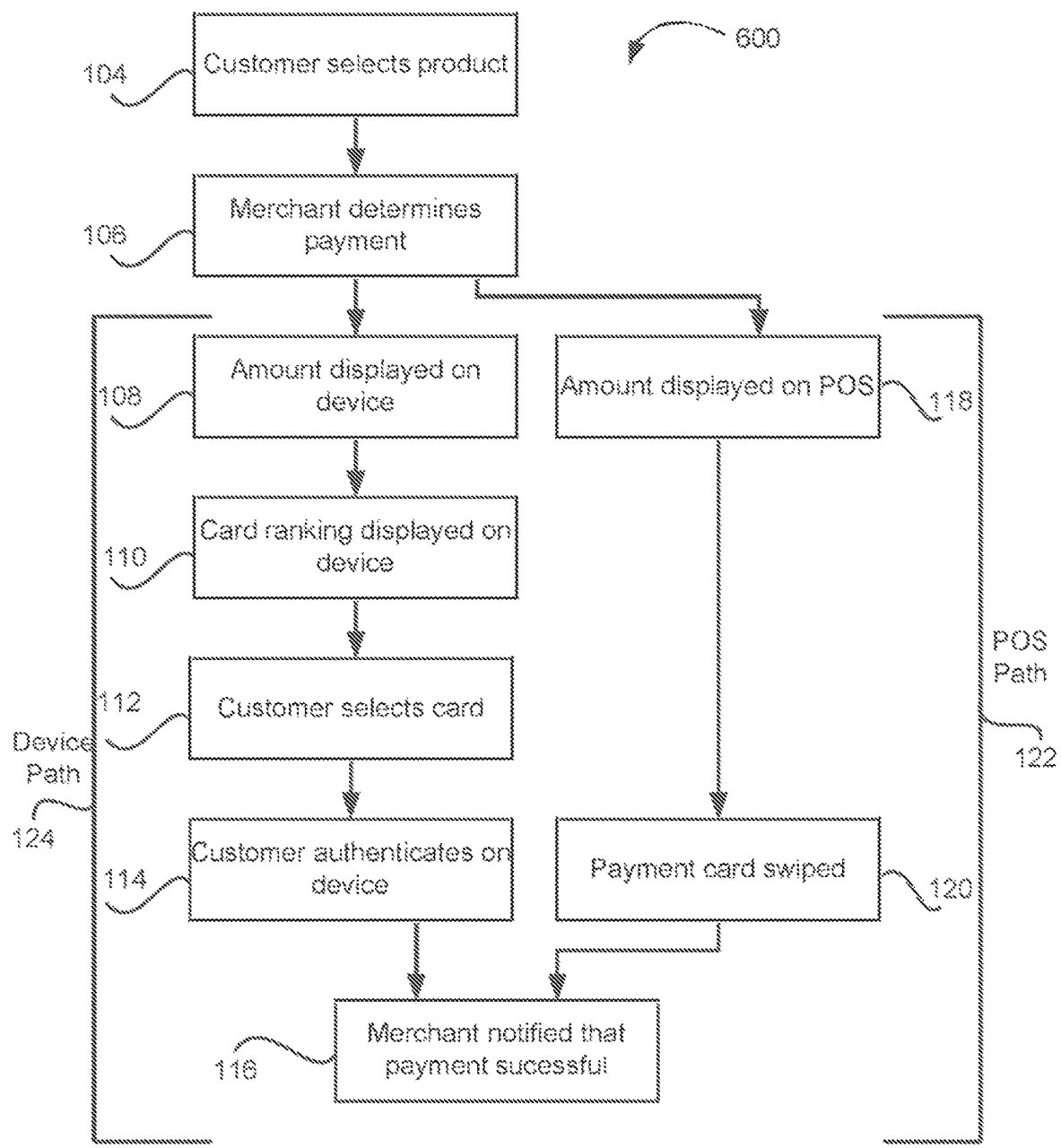
FIG. 6 illustrates a process flow for allowing card selection and executing a transaction, in accordance with various embodiments.

With reference now to FIGS. 1B and 6, contextual services delivery module 3 may perform a method consummating a transaction between a user and a merchant, as well as providing a user with an opportunity to select among a variety of payment mechanisms in response based on the context environment 18. For example, a customer may select a product (Step 104). The merchant linking engine 5 of the contextual services delivery processor 6 may evaluate a merchant linkage database 8, in response to the customer selecting a product. This selection by the user may comprise a context characteristic comprising a context environment 18. Subsequently, the merchant linking engine 5 may identify that the context environment 18 correspondingly links to a contextual service from services repository 4 that the merchant linkage database 8 indicates that a merchant desires a user to receive. The merchant linking engine 5 may communicate this information to a promotions engine 7. A promotions engine 7 may apply zero, one, or any number of promotions in response to this information, and direct a distribution engine 9 to display these promotions to a user. Thus, the merchant may be said to determine a payment amount for that product (Step 106). Subsequently, the distribution engine 9 may display a payment amount to the user. For example, a distribution engine 9 may distribute the information according to a device interaction path 124 and/or a POS interaction path 122. In other words, the distribution engine 9 may display an amount on the user's smartphone 14 (Step 108). In various embodiments, the distribution engine 9 may simultaneously display the amount on a POS terminal 16 (Step 118). Furthermore, the merchant linking engine 5 may identify that the context environment 18 correspondingly links to a contextual service from services repository 4 that the merchant linkage database 8 indicates that a merchant desires a user to receive. The merchant linking engine 5 may communicate this information to a promotions engine 7. A promotions engine 7 may identify the availability of multiple transaction accounts for this transaction in response to this information, and direct a distribution engine 9 to display different transaction account choices to the user via the user's smartphone 14 (Step 110). The customer may select a transaction account choice (Step 112) by transmitting a message via the smartphone 14 or may manually authenticate the transaction at the POS (Step 120), for example, by swiping a payment card, and thus bypassing the transaction account selection step. The promotions engine 7 may receive a customer's selection of transaction account and may communicate instructions to the settlement engine 11 which may store the user's account choice in non-transitory memory. Subsequently, a customer may authenticate the transaction on the smartphone 14 (Step 114), for example by an authentication service such as biometric fingerprint authentication. The settlement engine 11 may recall the stored transaction account choice and may process the payment information in response. The settlement engine 11 may subsequently notify the merchant, for example, by a message on a POS terminal 16, that payment is successful (Step 116). At various steps of the process, various different transaction, display, and authentication services may be provided based on different context environments 18.

The phrase "upsell opportunity" shall include any offer for an additional benefit, opportunity or purchase. For example, an "upsell opportunity" shall include an offer to purchase a higher priced good or service, a related good or service, a complementary good or service, a warranty, a service plan, services related to a purchase of a good, a good related to a purchase of a service, or any additional transaction or consideration, and the like.

Similarly, the phrase "promotion" shall include an offer for a price discount and/or an offer to provide additional and/or higher-quality items at the same price or at a lower price, or at a lower unit price and the like. Thus, it may be said that a promotion is an increase in the items provided to a customer for a given price, whereas an "upsell opportunity" may be said to be an increase in the amount of currency paid by the consumer. Accordingly, some upsell opportunities shall include promotions and some promotions shall include upsell opportunities.

As used herein, "match", "corresponds with" or "associated with" or similar phrases may include an identical match, a partial match, meeting certain criteria, matching a subset of data, a correlation, satisfying certain criteria, a correspondence, an association, an algorithmic relationship and/or the like. Similarly, as used herein, "authenticate" or similar terms may include an exact authentication, a partial authentication, authenticating a subset of data, a correspondence, satisfying certain criteria, an association, an algorithmic relationship and/or the like.

Any communication, transmission and/or channel discussed herein may include any system or method for delivering content (e.g. data, information, metadata, etc.), and/or the content itself. Moreover, the contextual services delivery system 2 may provide a standardized API interface for POS devices and/or software, merchants and third-party systems and devices. In this manner, a seamless user experience is presented, e.g., contextual services may be delivered in a variety of context environments 18 and in systems and in systems of systems having different devices and technologies. The content may be presented in any form or medium, and in various embodiments, the content may be delivered electronically and/or capable of being presented electronically. For example, a channel may comprise a website or device (e.g., Facebook, YouTube®, AppleTV®, Pandora®, xBox®, Sony® Playstation®), a uniform resource locator ("URL"), a document (e.g., a Microsoft Word® document, a Microsoft Excel® document, an Adobe .pdf document, etc.), an "ebook," an "emagazine," an application or microapplication (as described herein), an SMS or other type of text message, an email, facebook, twitter, MMS and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include Facebook®, Foursquare®, Twitter®, MySpace®, LinkedIn®, and the like. Examples of affiliate or partner websites include American Express®, Groupon®, LivingSocial®, and the like. Moreover, examples of mobile device communications include texting, email, and mobile applications for smartphones. In various embodiments and as used herein, a digital channel may be any suitable channel available to a user over a network, including for example, a social media channel, an entertainment channel, a service channel, a review channel, a service scheduling channel, and/or the like. The channel may include a user interface and user account that may be created by a user. Moreover, the user may be able to access the digital channel through a web client on any suitable electronic device. The digital channel may also be considered a non-traditional purchasing channel (e.g., a channel where information about an item may be present, but where the ability to purchase the item is not traditionally available such as, for example, an item page in a social media channel where information about an item is available).

The phrases consumer, customer, user, account holder, account affiliate, card member or the like shall include any person, entity, business, government organization, business, software, hardware, machine associated with a transaction account, buys merchant offerings offered by one or more merchants using the account and/or who is legally designated for performing transactions on the account, regardless of whether a physical card is associated with the account. The card member may include a transaction account owner, a transaction account user, an account affiliate, a child account user, a subsidiary account user, a beneficiary of an account, a custodian of an account, and/or any other person or entity affiliated or associated with a transaction account. In various embodiments, no physical card is associated with the account, and moreover, the user may not be a card member or have an account, but rather may access the system via a Facebook® profile, or via a web browser, for example, in order to access functionality of the contextual services delivery system 2 without being a card member.

Phrases and terms similar to "account", "account number", "account code" or "consumer account" as used herein, may include any device, code (e.g., one or more of an authorization/access code, personal identification number ("PIN"), Internet code, other identification code, and/or the like), number, letter, symbol, digital certificate, smart chip, digital signal, analog signal, biometric or other identifier/indicia suitably configured to allow the consumer to access, interact with or communicate with the system. The account number may optionally be located on or associated with a rewards account, charge account, credit account, debit account, prepaid account, telephone card, embossed card, smart card, magnetic stripe card, bar code card, transponder, radio frequency card or an associated account.

In various embodiments, a transaction account may be may include any account that may be used to facilitate a financial transaction including, for example, a charge account, a credit account, a bank account (e.g., a checking or savings account), and/or the like. The transaction account may include a transaction instrument such as a charge card, credit card, debit card, awards card, prepaid card, telephone card, smart card, magnetic stripe card, bar code card, transponder, radio frequency card and/or the like having an account number, which cardholders typically present to Service Establishments (SEs), as part of a transaction, such as a purchase. An "account number", as used herein, includes any device, code, number, letter, symbol, digital certificate, smart chip, digital signal, analog signal, biometric or other identifier/indicia suitably configured to allow the consumer to interact or communicate with the system, such as, for example, authorization/access code, personal identification number (PIN), Internet code, other identification code, and/or the like which is optionally located on card. The account number may be distributed and stored in any form of plastic, electronic, magnetic, radio frequency, wireless, audio and/or optical device capable of transmitting or downloading data from itself to a second device. A customer account number may be, for example, a sixteen-digit credit card number, although each credit provider has its own numbering system, such as the fifteen-digit numbering system used by American Express. Each company's credit card numbers comply with that company's standardized format such that the company using a sixteen-digit format will generally use four spaced sets of numbers, as represented by the number "0000 0000 0000 0000". The first five to seven digits are reserved for processing purposes and identify the issuing bank, card type, and etc. In this example, the last sixteenth digit is used as a sum check for the sixteen-digit number. The intermediary eight-to-ten digits are used to uniquely identify the customer.

In various embodiments, an account number may identify a consumer. In addition, in various embodiments, a consumer may be identified by a variety of identifiers, including, for example, an email address, a telephone number, a cookie id, a radio frequency identifier ("RFID"), a biometric, and the like. As used herein, a biometric may include a user's voice, fingerprint, facial, ear, signature, vascular patterns, DNA sampling, hand geometry, sound, olfactory, keystroke/typing, iris, retinal or any other biometric relating to recognition based upon any body part, function, system, attribute and/or other characteristic, or any portion thereof.

The system may include or interface with any of the foregoing accounts, devices, and/or a transponder and reader (e.g. RFID reader) in RF communication with the transponder (which may include a fob), or communications between an initiator and a target enabled by near field communications (NFC). Typical devices may include, for example, a key ring, tag, card, cell phone, wristwatch or any such form capable of being presented for interrogation. Moreover, the system, computing unit or device discussed herein may include a "pervasive computing device," which may include a traditionally non-computerized device that is embedded with a computing unit. Examples may include watches, Internet enabled kitchen appliances, restaurant tables embedded with RF readers, wallets or purses with imbedded transponders, etc. Furthermore, a device or financial transaction instrument may have electronic and communications functionality enabled, for example, by: a network of electronic circuitry that is printed or otherwise incorporated onto or within the transaction instrument (and typically referred to as a "smart card"); a fob having a transponder and an RFID reader; and/or near field communication (NFC) technologies.

Phrases and terms similar to "transaction account" may include any account that may be used to facilitate a financial transaction.

Phrases and terms similar to "financial institution" or "transaction account issuer" may include any entity that offers transaction account services. Although often referred to as a "financial institution," the financial institution may represent any type of bank, lender or other type of account issuing institution, such as credit card companies, card sponsoring companies, or third party issuers under contract with financial institutions. It is further noted that other participants may be involved in some phases of the transaction, such as an intermediary settlement institution.

Phrases and terms similar to "transaction" may include any purchase, exchange, lease, rental, deal, agreement, authorization, settlement, information exchange, item exchange, a record of charge (or "ROC"), record of transaction ("ROT"), including all related data and metadata, and/or the like. Moreover, the transaction, information associated with the transaction, and/or a record associated with the transaction may comprise a unique identifier associated with a transaction. A transaction may, in various embodiments, be performed by one or more account holders using a transaction account. The transaction account may be associated with a transaction instrument such as, for example, a gift card, a debit card, a credit card, and the like. A record associated with the transaction may, in addition, contain details such as location, merchant name or identifier, transaction amount, transaction date, account number, account security pin or code, account expiry date, and the like for the transaction.

Phrases and terms similar to "business" or "merchant" may be used interchangeably with each other and shall mean any person, entity, distributor system, software and/or hardware that is a provider, broker and/or any other entity in the distribution chain of items. For example, a merchant may be a grocery store, a retail store, a travel agency, a service provider, an on-line merchant or the like.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general-purpose digital computers or similar devices.

In various embodiments, the embodiments are directed toward one or more computer systems capable of carrying out the functionality described herein. The computer system includes one or more processors, such as processor. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., Windows operating system, UNIX®, Linux®, Solaris®, MacOS, etc.) as well as various conventional support software and drivers typically associated with computers.

Computer system also includes a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

A web client includes any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as iPads, iMACs, and MacBooks, kiosks, terminals, point of sale (POS) devices and/or terminals, televisions, or any other device capable of receiving data over a network. A web-client may run Microsoft Internet Explorer®, Mozilla Firefox®, Google® Chrome, Apple® Safari, or any other of the myriad software packages available for browsing the internet.

Practitioners will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In an exemplary embodiment, access is through a network or the Internet through a commercially-available web-browser software package.

In various embodiments, components, modules, and/or engines of systems may be implemented as micro-applications or micro-apps. Micro-apps are typically deployed in the context of a mobile operating system, including for example, a Palm® mobile operating system, a Windows® mobile operating system, an Android® Operating System, Apple® iOS, a Blackberry® operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

As used herein, the term "network" includes any cloud, cloud computing system or communications (e.g., electronic) system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., iPhone®, Palm Pilot®, Blackberry®), cellular phone, kiosk, etc.), online communications, satellite communications, offline communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, Appletalk, IP-6, NetBIOS, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein.

The various system components may be independently, separately or collectively suitably coupled to the network via data links which includes, for example, a connection to an Internet Service Provider (ISP) over the local loop as is typically used in connection with standard modem communication, cable modem, Dish Networks®, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any items, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/publications/nistpubs/800-145/SP800-145.pdf (last visited May 2014), which is hereby incorporated by reference in its entirety.

As used herein, "transmit" may include sending electronic data from one system component to another over a network connection. Additionally, as used herein, "data" may include encompassing information such as commands, queries, files, data for storage, and the like in digital or any other form.

Phrases and terms similar to an "item" may include any good, service, information, experience, data, discount, rebate, points, virtual currency, content, access, rental, lease, contribution, account, credit, debit, benefit, right, reward, points, coupons, credits, monetary equivalent, anything of value, something of minimal or no value, monetary value, non-monetary value and/or the like. Moreover, the "transactions" or "purchases" discussed herein may be associated with an item. Furthermore, a "reward" may be an item.

Phrases and terms similar to "transaction" may include any purchase, authorization, settlement, a record of charge (or "ROC"), record of transaction ("ROT") and/or the like. Moreover, the transaction, information associated with the transaction, and/or a record associated with the transaction may comprise a unique identifier associated with a transaction. A transaction may, in various embodiments, be performed by a one or more members using a transaction account, such as a transaction account associated with a transaction account such as, for example, a gift card, a debit card, a credit card, and the like. A record associated with the transaction may, in addition, contain details such as location, merchant name or identifier, transaction amount, transaction date, account number, account security pin or code, account expiry date, and the like for the transaction.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PM, GPG (GnuPG), and symmetric and asymmetric cryptosystems.

The computing unit of the web client may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of CMS to further enhance security.

Firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within a web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

The computers discussed herein may provide a suitable website or other Internet-based graphical user interface which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), AJAX (Asynchronous Javascript And XML), helper applications, plug-ins, and the like. A server may include a web service that receives a request from a web server, the request including a URL (http://yahoo.com/stockquotes/ge) and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WebSphere MQTM (formerly MQSeries) by IBM, Inc. (Armonk, NY) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

As used herein, the term "end user", "consumer", "customer", "cardmember", "business" or "merchant" may be used interchangeably with each other, and each shall mean any person, entity, government organization, business, machine, hardware, and/or software. A bank may be part of the system, but the bank may represent other types of card issuing institutions, such as credit card companies, card sponsoring companies, or third party issuers under contract with financial institutions. It is further noted that other participants may be involved in some phases of the transaction, such as an intermediary settlement institution, but these participants are not shown.

Each participant is equipped with a computing device in order to interact with the system and facilitate online commerce transactions. The customer has a computing unit in the form of a personal computer, although other types of computing units may be used including laptops, notebooks, hand held computers, set-top boxes, cellular telephones, touch-tone telephones and the like. The merchant has a computing unit implemented in the form of a computer-server, although other implementations are contemplated by the system. The bank has a computing center shown as a main frame computer. However, the bank computing center may be implemented in other forms, such as a mini-computer, a PC server, a network of computers located in the same of different geographic locations, or the like. Moreover, the system contemplates the use, sale or distribution of any items, services or information over any network having similar functionality described herein The merchant computer and the bank computer may be interconnected via a second network, referred to as a payment network. The payment network which may be part of certain transactions represents existing proprietary networks that presently accommodate transactions for credit cards, debit cards, and other types of financial/banking cards. The payment network is a closed network that is assumed to be secure from eavesdroppers. Exemplary transaction networks may include the American Express®, VisaNet® and the Veriphone® networks.

The electronic commerce system may be implemented at the customer and issuing bank. In an exemplary implementation, the electronic commerce system is implemented as computer software modules loaded onto the customer computer and the banking computing center. The merchant computer does not require any additional software to participate in the online commerce transactions supported by the online commerce system.

As will be appreciated by one of ordinary skill in the art, the system may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

Functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

Therefore, the following is claimed:

1. A method comprising:
identifying, by a computer based system, a mobile device of a user entering a store location based at least in part on a point of sale (POS) terminal at the store location detecting the mobile device by a BLUETOOTH communication protocol;
instantiating, by the computer based system, a user data session between the POS terminal and the mobile device;
identifying, by the computer based system, a context environment for the mobile device based at least in part on a user location of the mobile device within the store location;
detecting, by the computing based system, that the context environment includes a trigger for a contextual service from a services repository;
selecting, by the computer based system, an inventory display service for the mobile device based at least in part on the trigger for the contextual service and a merchant database comprising an instruction for providing the inventory display service to the mobile device;
causing, by the computer based system, a display of an inventory of products for the store location on the mobile device based at least in part on the inventory display service being selected;
receiving, by the computer based system, a selection of a product that has a first context characteristic;
causing, by the computer based system, a display of a payment amount for the product on the mobile device simultaneously with a display on the payment amount on the POS terminal based at least in part on the user data session;
determining, by the computer based system, a second context characteristic based at least in part on performing a sentiment analysis on a text from a plurality of social media posts associated with a plurality of respective products;
determining, by the computer based system, an additional product based at least in part on providing a machine learning directive with the first context characteristic and the second context characteristic, the machine learning directive being generated based at least in part on a plurality of past context environments;
detecting, by the computer based system, the mobile device being located at a POS terminal location based at least in part on the BLUETOOTH communication protocol;
causing, by the computer based system, a display of an update for the additional product on the mobile device based at least in part on the detection of the mobile device at the POS terminal location;
generating, by the computer based system, a modified payment amount of a transaction based at least in part on an acceptance of the additional product;
selecting, by the computer based system, a facial authentication service for the mobile device based at least in part on the context environment; and
authenticating, by the computer based system, the modified payment amount of the transaction using the facial authentication service based at least in part on biometric facial data received from the mobile device using the user data session, wherein the facial authentication service confirms an identity of the user and approves the modified payment amount.

2. The method of claim 1, wherein the display of the additional product on the mobile device is further based at least in part on determining a technical capability of the mobile device.

3. The method of claim 1, further comprising:
causing, by the computer based system, a display of the additional product on the POS terminal simultaneously with the display of the additional product on the mobile device.

4. The method of claim 1, further comprising:
transmitting, by the computer based system, a modified payment amount instruction to the POS terminal based at least in part on receiving the acceptance of the additional product from the mobile device.

5. The method of claim 1, wherein the inventory of products are accessible via a searchable mechanism on the mobile device.

6. The method of claim 1, further comprising:
receiving, by the computer based system, from the mobile device an authentication indication of the payment amount that has been modified; and
causing, by the computer based system, a display on the POS terminal that a payment for the payment amount has been processed based at least in part on receiving the authentication indication.

7. A system, comprising:
a computing device that comprises a processor and a memory;
program instructions stored in the memory that, when executed by the processor, cause the computing device to at least:
identify a mobile device of a user entering a store location based at least in part on a point of sale (POS) terminal at the store location detecting the mobile device by a BLUETOOTH communication protocol;
identify a context environment for the mobile device based at least in part on a user location of the mobile device within the store location being determined;
detect that the context environment includes a trigger for a contextual service from a services repository based at least in part on the user location;
select an inventory display service for the mobile device based at least in part on the context environment comprising the trigger and a merchant database comprising an instruction for providing the inventory display service to the mobile device based at least in part on a database record linking the store location to the inventory display service;
cause a display of an inventory of products for the store location on the mobile device based at least in part on a user data session with the POS terminal and the inventory display service being selected;
receive a selection of a product for the user, the product comprising a first context characteristic;
cause a display of a payment amount for the product on the mobile device simultaneously with a display on the payment amount on the POS terminal based at least in part on the user data session;
determine a second context characteristic based at least in part on a machine learning algorithm being provided a plurality of social media posts regarding a plurality of respective products;
determine an additional product based at least in part on providing a machine learning directive with the first context characteristic and the second context characteristic, the machine learning directive being generated based at least in part on a plurality of past context environments;
cause a display for the additional product on the mobile device;
receive an acceptance of the additional product from the mobile device;
generate a modified payment amount of a transaction at the POS terminal in response to the acceptance of the additional product;
select a facial authentication service for the mobile device from the services repository based at least in part on the context environment;
receive biometric facial data from the mobile device; and
authenticate the modified payment amount of the transaction using the facial authentication service based at least in part on the biometric facial data received from the mobile device, wherein the facial authentication service confirms an identity of the user and approves the modified payment amount.

8. The system of claim 7, wherein the additional product is at least one of a complementary product or an upsell opportunity.

9. The system of claim 7, wherein the display of the additional product on the mobile device is further based at least in part on determining a technical capability of the mobile device.

10. The system of claim 7, wherein the program instructions, when executed by the processor, cause the computing device to at least:
cause a display of the additional product on the POS terminal simultaneously with the display of the additional product on the mobile device.

11. The system of claim 7, wherein the program instructions, when executed by the processor, cause the computing device to at least:
transmit a modified payment amount instruction to the POS terminal based at least in part on receiving the acceptance of the additional product from the mobile device.

12. The system of claim 7, wherein the inventory of products are accessible via a searchable mechanism on the mobile device.

13. The system of claim 7, wherein the program instructions, when executed by the processor, cause the computing device to at least:
   receive from the mobile device an authentication indication of the payment amount that has been modified; and
   cause a display of a notification on the POS terminal, the notification indicating that a payment for the payment amount has been processed based at least in part on receiving the authentication indication.

14. The system of claim 7, wherein the first context characteristic comprises a date and time of a transaction or a transaction categorization.

15. A non-transitory computer-readable medium embodying program instructions executable in a computing device that, when executed by the computing device, cause the computing device to at least:
   identify a mobile device of a user entering a store location based at least in part on a point of sale (POS) terminal at the store location detecting the mobile device by a BLUETOOTH communication protocol;
   identify a context environment for the mobile device based at least in part on a user location of the mobile device within the store location;
   detect that the context environment includes a trigger for a contextual service from a services repository based at least in part on the user location;
   select an inventory display service for the mobile device based at least in part on the trigger for the contextual service and a merchant database comprising an instruction for providing the inventory display service to the mobile device based at least in part on a database record linking the store location to the inventory display service;
   cause a display of an inventory of products for the store location on the mobile device based at least in part on a user data session with the POS terminal and the inventory display service being selected;
   receive a selection of a product that comprising a first context characteristic;
   cause a display of a payment amount for the product on the mobile device simultaneously with a display on the payment amount on the POS terminal based at least in part on the user data session;
   determine a second context characteristic based at least in part on a machine learning algorithm being provided a plurality of social media posts;
   determine an additional product based at least in part on providing a machine learning directive with the first context characteristic of the product and the second context characteristic, the machine learning directive being generated based at least in part on a plurality of past context environments;
   cause a display of an update for the additional product on the mobile device;
   receive an acceptance of the additional product from the mobile device;
   generate a modified payment amount of a transaction at the POS terminal in response to the acceptance of the additional product;
   select a facial authentication service for the mobile device based at least in part on the context environment;
   receive biometric facial data from the mobile device using the user data session; and
   authenticate the modified payment amount of the transaction using the facial authentication service based at least in part on biometric data received from the mobile device using the user data session, wherein the facial authentication service confirms an identity of the user and approves the modified payment amount.

16. The non-transitory computer-readable medium of claim 15, wherein the additional product is at least one of a complementary product or an upsell opportunity.

17. The non-transitory computer-readable medium of claim 15, wherein the display of the additional product on the mobile device is further based at least in part on determining a technical capability of the mobile device.

18. The non-transitory computer-readable medium of claim 15, wherein the program instructions when executed by the computing device, cause the computing device to at least:
   cause a display of the additional product on the POS terminal simultaneously with the display of the additional product on the mobile device.

19. The non-transitory computer-readable medium of claim 15, wherein the authentication of the modified payment amount of the transaction is further based at least in part on a location of the mobile device of the user being proximate to the POS terminal.

20. The non-transitory computer-readable medium of claim 15, wherein the services repository comprises a database for a plurality of contextual services.

* * * * *